(12) United States Patent
Ziegler

(10) Patent No.: US 6,273,649 B1
(45) Date of Patent: Aug. 14, 2001

(54) CUTTING TOOL ASSEMBLY

(76) Inventor: Karl Ziegler, 2 Birrell Court, Kew, Victoria, 3101 (AU)

( * ) Notice: Subject to any disclaimer, the term of this patent is extended or adjusted under 35 U.S.C. 154(b) by 0 days.

(21) Appl. No.: 09/284,658

(22) PCT Filed: Oct. 17, 1997

(86) PCT No.: PCT/AU97/00695

§ 371 Date: Apr. 15, 1999

§ 102(e) Date: Apr. 15, 1999

(87) PCT Pub. No.: WO98/17426

PCT Pub. Date: Apr. 30, 1998

(30) Foreign Application Priority Data

Oct. 17, 1996 (AU) .................................................. PO3043

(51) Int. Cl.$^7$ .............................. B23B 29/00; B26D 1/02
(52) U.S. Cl. ........................ 407/101; 407/107; 407/109
(58) Field of Search .................................... 407/101, 107, 407/104, 66, 72, 76, 88, 109; 82/161, 157, 158

(56) References Cited

U.S. PATENT DOCUMENTS

| | | | | | |
|---|---|---|---|---|---|
| 2,949,662 | * | 8/1960 | Cook et al. | ....................... | 407/109 X |
| 3,015,241 | * | 1/1962 | Konwal | ............................ | 407/109 X |
| 3,156,031 | * | 11/1964 | Lundgren | .............................. | 407/109 |
| 3,376,771 | * | 4/1968 | Barnes | ................................... | 82/161 |
| 3,568,283 | * | 3/1971 | Wyss | ................................ | 407/109 X |
| 3,704,958 | | 12/1972 | Gulibon et al. | ..................... | 408/153 |
| 3,811,162 | | 5/1974 | Bay | ............................................ | 29/96 |
| 4,080,854 | * | 3/1978 | Peterson | ............................... | 407/79 X |
| 4,945,793 | * | 8/1990 | Von Hass | ............................. | 82/157 X |
| 5,737,984 | * | 4/1998 | Francia | ................................. | 82/157 |
| 5,833,403 | | 11/1998 | Barazani | ............................... | 407/101 |
| 5,961,259 | * | 10/1999 | Ziegler | ................................ | 407/76 X |

FOREIGN PATENT DOCUMENTS

WO 96/12592    5/1996  (WO) .
WO 96/33833   10/1996  (WO) .

* cited by examiner

*Primary Examiner*—Henry Tsai
(74) *Attorney, Agent, or Firm*—Wolf, Greenfield & Sacks, P.C.

(57) ABSTRACT

A cutting tool assembly which includes a shank (1) and a removable cartridge (3) on which is mounted a cutting insert (5). The shank (1) is for mounting the assembly on a cutting machine. The cartridge (3) is removably mounted by a screw fastener (7) which passes through a hole in shank (1) into a threaded hole (31) in cartridge (3). The shank includes a recess (9) having sloping facing walls (15, 17) for engaging a complementary seating portion, having sloping walls (25, 27), of cartridge (3). The recess (9) and complementary seating portion of the cartridge are shaped such that the cartridge is wedged in the recess when the screw fastener (7) is tightened. The invention allows a reduction in costs by providing for the exchange of cartridges rather than a whole cutting tool. The wedging interconnection of the cartridge and shank ensures rigidity of the assembly. A modification is described wherein a recess for a screw fastener is provided instead of a hole (23) which allows for quick exchange of cartridges.

23 Claims, 5 Drawing Sheets

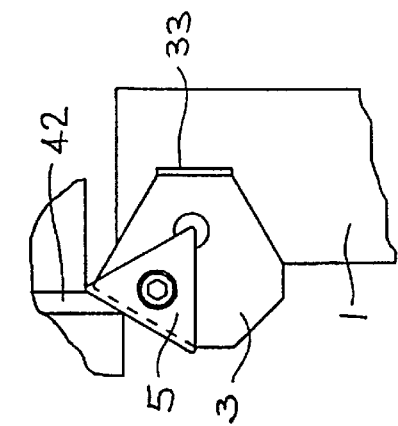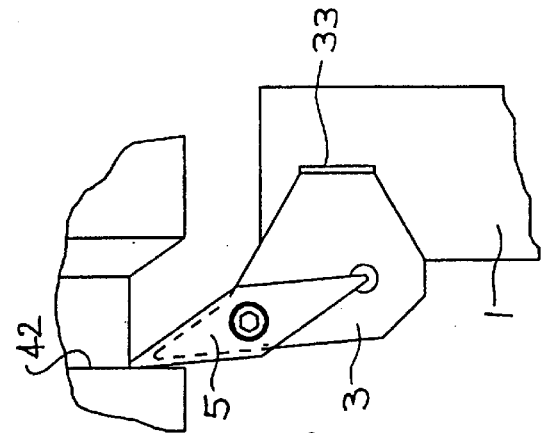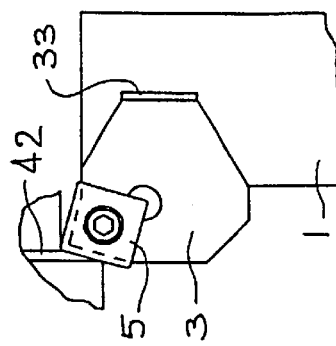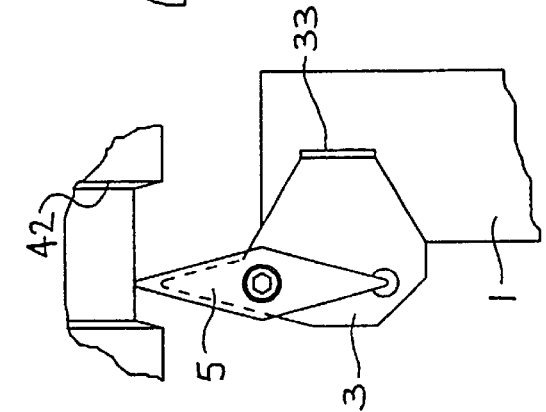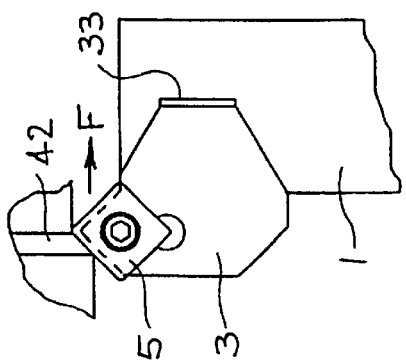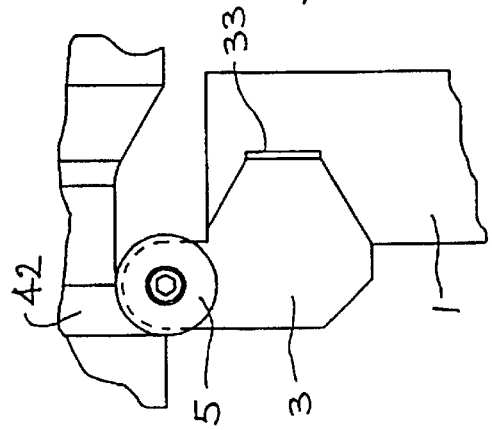

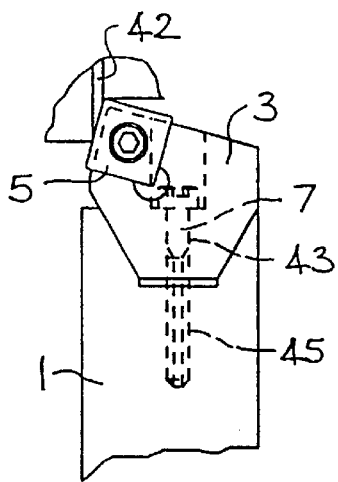
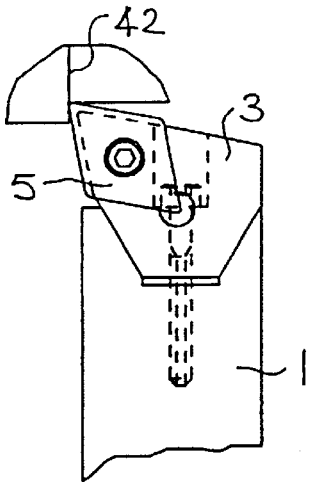
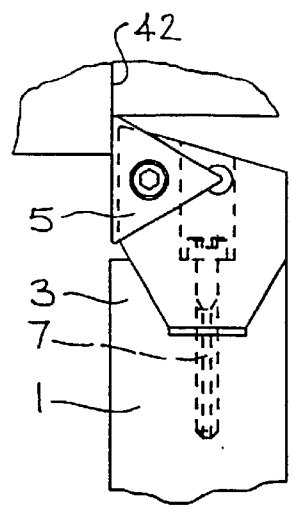
FIG 12  FIG 14A  FIG 15
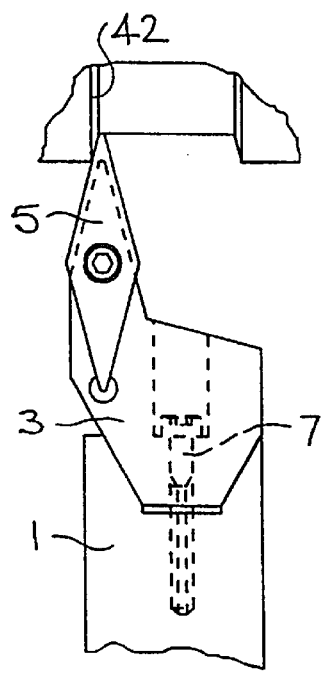
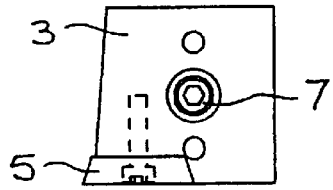
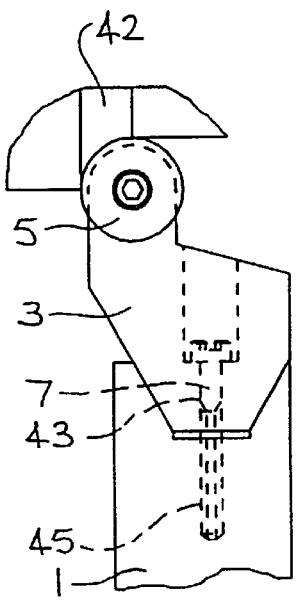
FIG 13  FIG 14B  FIG 16

CUTTING TOOL ASSEMBLY

TECHNICAL FIELD

The present invention relates to a cutting tool assembly that includes a shank and an exchangeable cartridge, the cartridge having a cutting means thereon. The cutting means may be an integral portion of the cartridge or a cutting insert mounted on the cartridge. The cutting tool assembly is for use in different metal cutting operations, for example, turning, grooving, threading, boring or facing wherein the tool assembly is mounted on a machine carriage, as in, for example, a lathe.

BACKGROUND OF THE INVENTION

A cutting tool is a relatively expensive item and this expense is compounded if a machining business has to carry a stock of different cutting tools in order to perform different cutting operations. The present invention allows for a reduction in this expense in that it provides for the exchange of a cutting cartridge on a shank rather than the exchange of a whole cutting tool. As the cost of a cartridge is a fraction of the cost of a whole tool, a business can reduce its expenses by carrying a stock of cartridges in place of a stock of tools as such, wherein different cartridges of the stock may be provided with different cutting means or carry different cutting inserts for performing different operations.

A problem with a cutting tool assembly that has an exchangeable cartridge is that the rigidity of the tool is lessened because there is no longer an integral shank supporting the cutting means or insert. The present invention addresses this problem whilst allowing for relatively ready exchange of one cutting cartridge for another.

DISCLOSURE OF THE INVENTION

According to the invention there is provided a cutting tool assembly including, a shank for mounting the cutting tool assembly on a cutting machine, a cartridge which is mountable on the shank, a cutting means on the cartridge, and releasable screw means for securing the cartridge on the shank, wherein the shank includes a seating portion for engaging the cartridge and the cartridge includes a complementary seating portion for engaging the shank, wherein each seating portion is defined by surfaces which slope towards each other such that one seating portion wedges within the other on tightening the screw means to secure the cartridge on the shank, whereby substantially all cutting forces are transmitted from the cartridge to the shank via the wedged seating portions.

Preferably the cutting means is a cutting insert that is mounted on the cartridge.

Preferably the seating portion of the shank is provided by surfaces defining a recess in the shank and the complementary seating portion of the cartridge is a bearing part for wedging within the recess.

The invention provides a stable and rigid interconnection between the cutting cartridge and the shank by virtue of the wedging of one part within the other. This wedging action is ensured by the relative shapes of a recess, which is preferably in the shank, and the complementary seating portion of the cartridge, and the screw means which is operable to clamp the complementary seating portion of the cartridge into engagement with the recess.

Preferably the recess includes facing surfaces which slope towards each other towards a base surface of the recess, and the seating portion of the cartridge which is received in the recess preferably includes opposite surfaces having a complementary slope to that of the surfaces of the recess. When the surfaces of the recess and cartridge have the same slope, a wedging of the cartridge within the recess is ensured by providing a clearance space between the base of the recess and an end face of the cartridge. Alternatively, the taper of the cartridge portion that seats in the recess may be slightly greater than that of the surfaces of the recess to ensure the wedging.

Preferably the assembly is such that a cutting force on the cutting means acts on the cartridge in the wedging direction, thereby increasing the force of contact of the cartridge portion in the shank recess. This feature assists the rigidity of the interconnection between the cutting cartridge and the shank. However the invention includes other arrangements, for example, where the cutting force acts across the wedging direction, that is along the recess rather than normal to it.

Preferably the screw means comprises a threaded hole in either the cartridge or the shank and a screw fastener which passes through a hole in the other part for engaging in the threaded hole and which is operable to clamp the cartridge into wedging engagement with the shank.

Preferably the shank and the cartridge include locating means for locating the cartridge on the shank such that the through hole and the threaded hole are aligned for reception of the screw fastener. This feature assists the quick exchange of a cartridge in that misalignment of the holes and thereby further manipulation of the position of the cartridge relative to the shank is eliminated.

Alternatively the cartridge may include a threaded hole and the shank may include a recess instead of a hole for receiving a screw fastener having a head, wherein the recess includes a shoulder against which the head of the screw fastener bears for securing the cartridge on the shank. With this alternative the cartridge is removable from the shank by loosening the screw fastener to allow it to be withdrawn from the recess whilst still engaged in the threaded hole in the cartridge, that is, the cartridge and the screw fastener are removable as a unit. This alternative provides for a quick exchange of one cartridge for another in that a mere loosening and then tightening rather than a complete removal and then re-insertion of a screw fastener is all that is required to be able to effect the exchange.

The shank and the cartridge with its cutting means may be arranged to provide a left hand or a right hand cutting tool. Also the shank may have a seating portion at both ends to allow it to carry two cartridges, for example to provide for a left hand or a right hand tool using the one shank.

The invention provides a cutting tool assembly which is simple and user friendly, involving components that are relatively easily manufactured and can be readily assembled to provide a complete tool and disassembled for the fitting of another cutting cartridge to vary that tool. The shank with its seating portion and the complementary seating portion of each of a stock of cartridges allow for a reliably accurate positioning of any one of a range of cartridges on a shank and for a cartridge to be rigidly interconnected with a shank.

Embodiments of the invention will now be described by way of non-limiting example only, with reference to the accompanying drawings.

BRIEF DESCRIPTION OF DRAWINGS

FIGS. 12–16 illustrate an alternative assembly configuration to that of FIGS. 3–11.

BEST MODES FOR CARRYING OUT THE INVENTION

Figure 1:
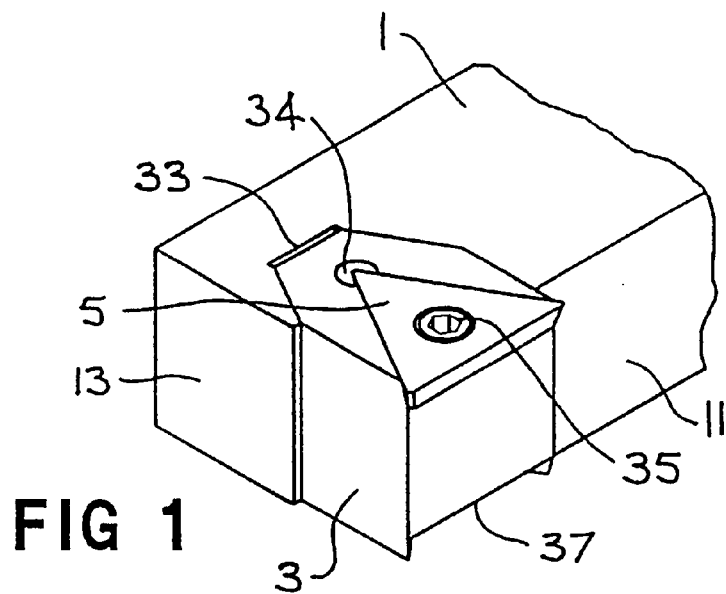
FIG. 1 is a perspective view of a cutting tool assembly according to a first embodiment of the invention.

In the drawings, the same reference numeral is used in the various figures (except for FIG. 17) to indicate corresponding components or features.

Figure 2:
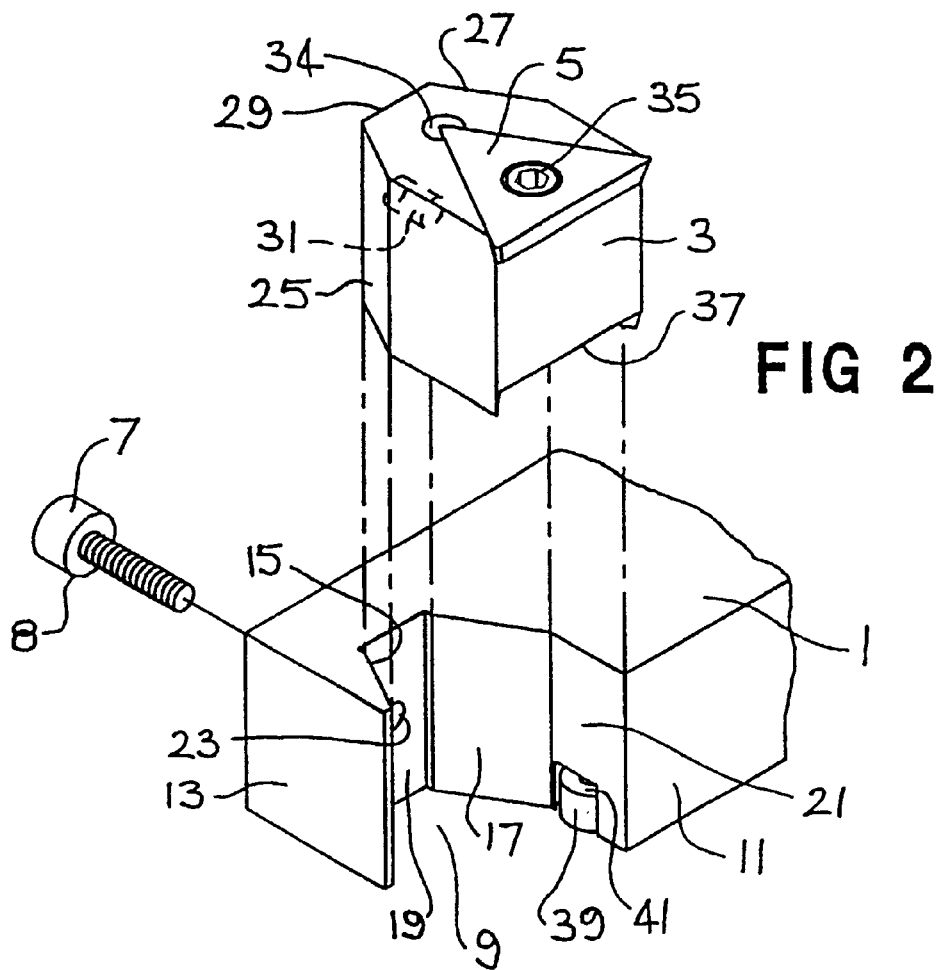
FIG. 2 is an exploded perspective view of the tool assembly of FIG. 1, FIGS. 3–11 illustrate various cartridge and cutting insert configurations.
Figure 9:
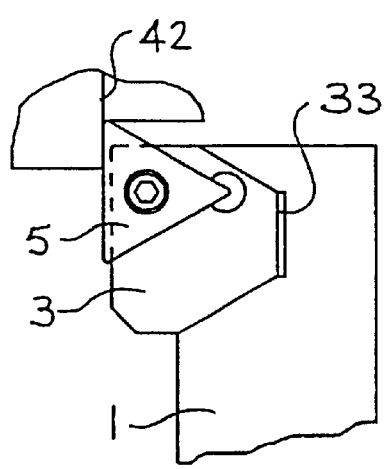
Figure 11:
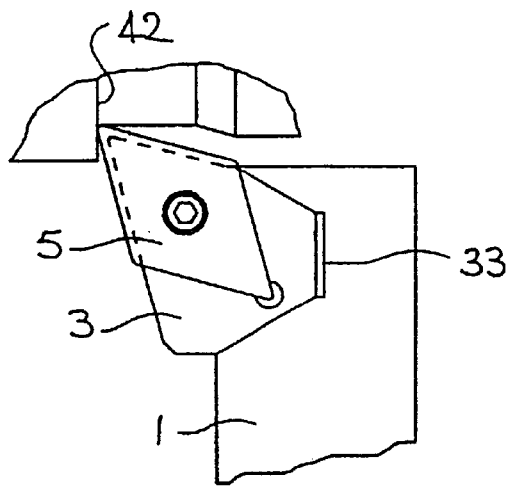
Figure 10A:
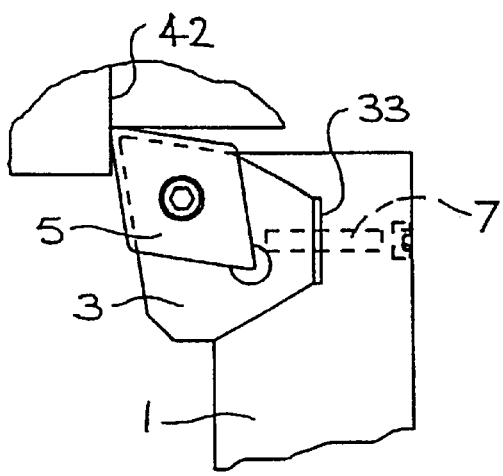
Figure 10B:
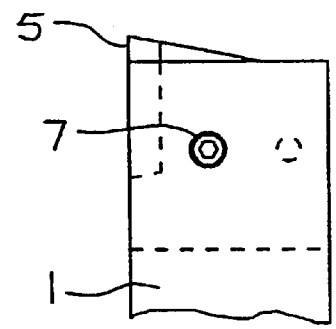

The cutting tool assembly shown in FIGS. 1 and 2 comprises a shank 1, a cartridge 3 which has a cutting insert 5 mounted thereon, and a releasable screw fastener 7 for securing the cartridge 3 on the shank 1. Screw 7 is preferably made of a high tensile steel and has a hexagon socket (not shown) in a circular head 8 requiring the use of an Allen key (not shown) to tighten or loosen it. Shank 1 has a square section, however shanks having other cross-sectional shapes are encompassed within the scope of the invention. The shank 1 is provided with a recess 9 extending across its width and opening at a side face 11 and end face 13 of the shank 1. The recess includes facing surfaces 15, 17 which slope inwardly towards a base surface 19 of the recess 9. Sloping surface 15 meets end face 13 of the shank 1, whereas sloping surface 17 joins a surface 21 which is substantially parallel to end face 13 and extends to the side face 11 of the shank 1. The included angle of surfaces 15 and 17 is preferably 60°, however other angles are encompassed within the scope of the invention. The recess 9 in shank 1 provides a seating portion for engaging the cartridge 3. A hole 23 extends through the shank 1 to open at the base 19 of recess 9 for passage of the screw fastener 7.

Cartridge 3 is configured to provide a complementary seating portion for engaging the shank 1, which portion seats within recess 9 and comprises opposite surfaces 25, 27 that slope inwardly towards an end face 29 with an included angle the same as that of the recess surfaces 15 and 17. End face 29 also includes a hole 31 which is threaded to receive screw fastener 7. On tightening screw 7, cartridge 3 is drawn into wedging engagement with shank 1 within the recess 9, the wedging being ensured by the provision of a clearance space 33 (see FIG. 1) between the base 19 of the recess 9 and the facing end face 29 of cartridge 3.

Cartridge 3 includes an appropriately shaped cut out portion having a relief hole 34 for seating cutting insert 5 which is fixed in position by a screw 35. This mounting of the cutting insert on the cartridge 3 is a known mounting method for a cutting insert and thus will not be described in any further detail herein. The cartridge 3 shown in FIGS. 1 and 2 includes a cut out portion 37 on its opposite surface within which another cutting insert may be mounted if required. The shape of the cartridge and/or its cut out portion can be varied to suit different cutting inserts for performing different cutting operations, as will be evident from an inspection of FIGS. 3–16.

A disposition of the recess 9 in the shank 1 relative to the positioning of the cutting insert 5 on cartridge 3 in which the direction of the cutting force acting on the cartridge 3 will be in the wedging direction (as in FIGS. 1 and 2) is preferred because it enhances the seating of the cartridge 3 in the recess 9. This is illustrated by the arrow F shown in FIG. 3. However the invention encompasses other arrangements, for example where the cutting force acts along the direction of the recess (not illustrated) or across it as would be the case for the FIGS. 12–16 arrangements.

The shank 1 may include a recess (not shown) at the entrance of hole 23 for fully or partially receiving the head 8 of screw fastener 7. This provides a neat and safer finish as protuberances are reduced. Another modification is that hole 31 can include a smooth bore for a portion of its length from end face 29 having a diameter which accurately matches that of hole 23, and screw fastener 7 can have a smooth shank portion between head 8 and its threaded portion which is accurately sized to fit the smooth bore portion and hole 23 with minimal clearance. This modification assists in accurately locating a cartridge on a shank and provides a more solid interconnection.

As shown in FIG. 2, the shank 1 may also include a tapped hole for receiving a second screw 39. The entrance to the hole is recessed for receiving the head of screw 39 and the recess opens at wall 21 such that the head protrudes past wall 21 and into recess 9. This provides a locating means for the cartridge 3, which may be provided with a recessed shoulder (not shown) for bearing on the underhead surface 41 of the screw 39. The locating means functions to locate cartridge 3 on shank 1 such that holes 23 and 31 are accurately aligned for reception of screw fastener 7. Alternatively cartridge 3 may be provided with a pin (not shown) for seating in a hole (not shown) in one of the walls of recess 9. Such locating means as provided, for example, by the screw 39 or a pin, is an optional feature for the invention and may be omitted if desired.

FIGS. 3–11 show various cartridge and cutting insert configurations for a cutting tool assembly according to the invention, all of which can use the one shank configuration (a screw means for securing the cartridge to the shank has been omitted from all figures except 10A for the sake of clarity). FIGS. 3–9, 10A and 11 are top plan views and FIG. 10B is a side view of FIG. 10A. A workpiece on which the tools are operating is shown by reference 42.

FIGS. 12–16 show an alternative configuration for the shank and cartridge wherein the recess 9 is formed in an end face of the shank 1 and the cartridge 3 has a through hole 43 for passage of a screw fastener 7 which screws into a threaded hole 45 in the shank. FIGS. 12, 13, 14A, 15 and 16 are top plan views and FIG. 14B is an end view of FIG. 14A.

Figure 17:
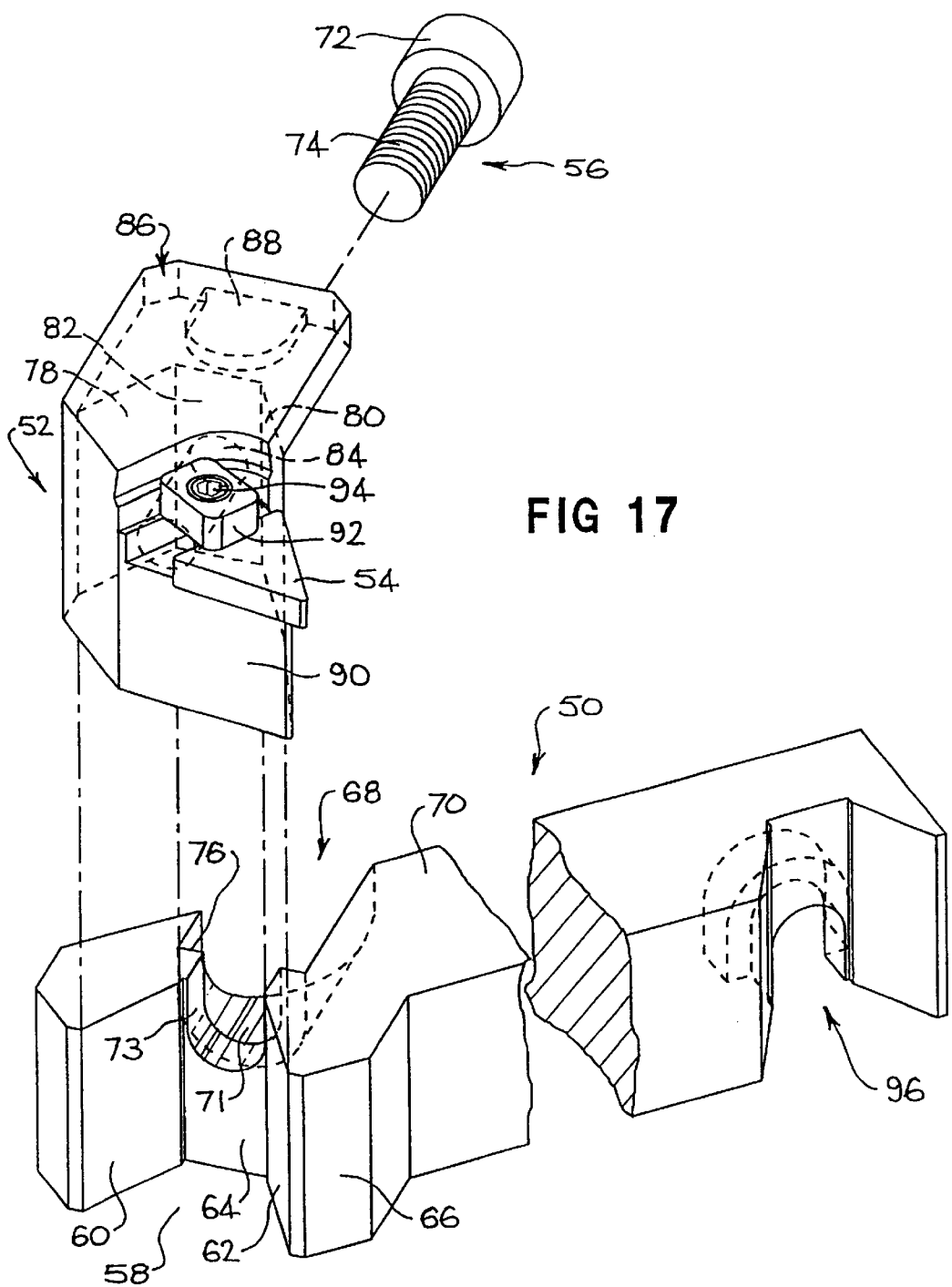
FIG. 17 is an exploded perspective view of a cutting tool assembly according to a further embodiment, wherein the cartridge is quickly releasable from the shank.

The cutting tool assembly shown in FIG. 17 comprises a shank 50, a cartridge 52 which has a cutting insert 54 mounted thereon, and a releasable screw fastener 56 for securing the cartridge 52 on the shank 50. Shank 50 is provided with a recess 58 at one end which includes facing surfaces 60, 62 which slope towards each other towards a base surface 64 of the recess 58. The included angle of facing surfaces 60, 62 is preferably 60°. Recess 58 is angled relative to shank 50 at 45° and thus shank 50 includes a protruding 7 section 66 to accommodate the recess 58. A recess 68, which is open at the top surface 70 of shank 50, extends between the base surface 64 of recess 58 and the opposite side surface of the shank 50. Recess 68 includes a curved bottom surface and is for accommodating the screw fastener 56. It includes a first section 71 having a width to accommodate the head 72 of screw fastener 56 and a second section 73 having a narrower width to accommodate the screw threaded shank 74 of screw fastener 56. Thus a shoulder formation 76 is defined where the first and second sections 71 and 73 of the recess 68 meet.

Cartridge 52 is configured to provide a complementary seating portion for engaging the shank 50, which portion seats within recess 58 and comprises opposite surfaces 78, 80 which slope towards each other towards an end face 82 with an included angle the same as that of surfaces 60, 62 of recess 58. End face 82 includes a threaded hole 84 which receives screw fastener 56. On tightening screw 56 (for which purpose it includes a socket formation (not shown) in its head for receiving a tool such as an Allen key) cartridge 52 is clamped into wedging engagement within recess 58 in shank 50, the wedging being ensured by a small clearance space between end surface 82 of cartridge 52 and base surface 64 of recess 58. Cartridge 52 also includes a rearwardly extending flange 86 at its upper face which seats an upper surface 70 of shank 50 for locating the cartridge 52 relative to shank 50, when assembling the tool, such that threaded hole 84 is accurately aligned relative to recess 68. Flange 86 includes a cutout portion 88 in its undersurface to provide clearance for the head 72 of screw 56.

Cartridge 52 has a nose portion 90 on which is mounted the cutting insert 54. Cutting insert 54 can be mounted on cartridge 52 by a clamping plate 92 and screw 94 arrangement, or by any other known and suitable method.

Screw fastener 56 can be screwed part-way into hole 84 in cartridge 52 prior to assembling the cartridge onto the shank 50. Thus the cartridge 52 and screw fastener can be quickly assembled and disassembled from shank 50 as a unit by virtue the screw fastener 56 can be placed into and removed from the recess 68 in a direction transversely of the length of the screw fastener. When the cartridge 52/screw fastener 56 unit is positioned on shank 50, the screw fastener can be tightened such that its head 72 bears on shoulder 76 thereby clamping the cartridge into wedging engagement with the shank. The cartridge is removable simply by loosening screw 56 to allow the cartridge 52/screw fastener 56 unit to be lifted clear of the shank 50.

The shank 50 may include a similar seating portion 96 at its other end, which may be at the same or a different angle relative to shank 50 as the seating portion comprising recess 58. The illustrated seating portion 96 provides for a right angled assembly of a cartridge such as 52 on the shank 50.

The shank and cartridge components of a cutting tool assembly according to the invention may be manufactured from metal stock using conventional machining operations such as milling or broaching. Alternatively, a cartridge according to the invention may be manufactured using a sintering process.

The invention described herein is susceptible to variations, modifications and/or additions other than those specifically described and it is to be understood that the invention includes all such variations, modifications and/or additions which fall within the spirit and scope of the following claims.

What is claimed is:

1. a cutting tool assembly including, a shank for mounting the cutting tool assembly on a cutting machine, a cartridge which is mountable on the shank, a cutting means on the cartridge, and releasable screw means for securing the cartridge on the shank, wherein the shank includes a seating portion for engaging the cartridge and the cartridge includes a complementary seating portion for engaging the shank, wherein each seating portion is defined by planar surfaces which converge such that one seating portion is an extending bearing part and the other is a recess within which the bearing part wedges on tightening the screw means to secure the cartridge on the shank, the screw means being positioned to act in a direction towards which the planar surfaces converge to increase the wedging of the bearing part in the recess, whereby substantially all cutting forces are transmitted from the cartridge to the shank via the wedged seating portions.

2. A cutting tool assembly as claimed in claim 1, wherein the seating portion of the shank defines a recess in the shank and the complementary seating portion of the cartridge is a bearing part for wedging within the recess.

3. A cutting tool assembly as claimed in claim 2 wherein the surfaces defining the recess in the shank include opposite side surfaces which converge towards a base surface of the recess.

4. A cutting tool assembly as claimed in claim 3 wherein the bearing part of the cartridge includes opposite side surfaces which converge towards an end face of the bearing part, wherein the slope of said opposite surfaces is the same as that of said facing surfaces of the recess in the shank, wherein the bearing part of the cartridge wedges in the recess of the shank by virtue the end face of the bearing part is spaced from the base surface of the recess when the cartridge is mounted on the shank.

5. A cutting tool assembly as claimed in any one of claims 1 to 4 wherein the cutting means on the cartridge is located relative to the seating portions of the cartridge and the shank such that in use of the cutting tool, a cutting force on the cutting means acts in a direction which increases the wedging of one seating portion within the other.

6. A cutting tool assembly as claimed in claim 5 wherein the cutting means is an exchangeable cutting insert that is mounted on the cartridge.

7. A cutting tool assembly as claimed in claim 1 wherein the shank includes a through hole and the cartridge includes a threaded hole, wherein the screw means comprises the threaded hole and a screw fastener, wherein the screw fastener passes through the hole in the shank and into the threaded hole in the cartridge for securing the cartridge on the shank.

8. A cutting tool assembly as claimed in claim 1 wherein the cartridge includes a threaded hole, wherein the screw means comprises the threaded hole and a screw fastener for engaging in the threaded hole and having a head, wherein the shank includes a recess for receiving the screw fastener, the recess including a shoulder against which the head of the screw fastener bears for securing the cartridge on the shank, wherein the cartridge is removable from the shank by loosening the screw fastener to allow it to be withdrawn from the recess whilst still engaged in the threaded hole in the cartridge.

9. A cutting tool assembly as claimed in claim 1 wherein the cartridge includes a through hole and the shank includes a threaded hole, wherein the screw means comprises the threaded hole and a screw fastener, wherein the screw fastener passes through the hole in the cartridge and into the threaded hole in the shank for securing the cartridge on the shank.

10. A cutting tool assembly as claimed in claim 9 wherein the shank includes an end face at right angles to a longitudinal axis of the shank, wherein the seating portion of the shank is defined by a recess formed in said end face, wherein said threaded hole in the shank extends along said longitudinal axis from a base of said recess.

11. A cutting tool assembly as claimed in claim 7, 8, 9 or 10 wherein the shank and the cartridge include locating means for locating the cartridge on the shank such that the through hole and the threaded hole are aligned for reception of the screw fastener.

12. A cutting tool, comprising:
   a shank having a first seating portion and a mounting region configured to enable the shank to be mounted on a cutting machine;
   a cartridge having a second seating portion complementary to said first seating portion and configured to engage the shank and mount said cartridge on the shank;

a cutting edge on the cartridge; and a releasable fastener configured to secure the cartridge on the shank;

wherein said first and second seating portions are defined by planar surfaces such that one is an extending bearing part and the other is a recess within which the bearing part wedges upon being secured by the releasable fastener, the fastener being positioned to act in a direction towards which the planar surfaces converge to increase the wedging of the bearing part in the recess.

13. The cutting tool assembly of claim 12, wherein the first seating portion defines a recess in the shank and the second seating portion is a bearing part for wedging within the recess.

14. The cutting tool assembly of claim 12, wherein the surfaces defining the recess in the shank include opposite side surfaces which converge towards a base surface of the recess.

15. The cutting tool assembly of claim 14, wherein the bearing part of the cartridge includes opposite side surfaces which converge towards an end face of the bearing part, wherein a rate of convergence of said opposite surfaces is the same as a rate of convergence of said facing surfaces of the recess in the shank, and wherein the end face of the bearing part is spaced from the base surface of the recess when the cartridge is mounted on the shank.

16. The cutting tool assembly of any one of claims 12 to 15, wherein the cutting edge on the cartridge is located relative to the seating portions of the cartridge and the shank such that in use of the cutting tool, a cutting force on the cutting edge acts in a direction which increases the wedging of one seating portion within the other.

17. The cutting tool assembly of claim 16, wherein the cutting edge is formed on an exchangeable cutting insert that is mounted on the cartridge.

18. The cutting tool assembly of claim 12, wherein the shank includes a through hole and the cartridge includes a threaded hole, and wherein the releasable fastener comprises a screw fastener configured to pass through the hole in the shank and configured to threadably engage the threaded hole in the cartridge to secure the cartridge on the shank.

19. The cutting tool assembly of claim 12, wherein the cartridge includes a threaded hole for receiving the releasable fastener and the shank includes a recess, and the releasable fastener comprising a screw fastener configured to threadably engage the threaded hole and having a head configured to bear against a shoulder of the recess to secure the cartridge on the shank.

20. The cutting tool assembly of claim 19, wherein the cartridge is removable from the shank by loosening the screw fastener to allow the screw to be withdrawn from the recess while remaining threadably engaged in the threaded hole in the cartridge.

21. The cutting tool assembly of claim 12, wherein the cartridge includes a through hole and the shank includes a threaded hole, wherein the releasable fastener comprises a screw fastener configured to pass through the hole in the cartridge and configured to threadably engage the threaded hole in the shank for securing the cartridge on the shank.

22. The cutting tool assembly of claim 21, wherein the shank includes an end face at right angles to a longitudinal axis of the shank, wherein the seating portion of the shank is defined by a recess formed in said end face, and wherein said threaded hole in the shank extends along said longitudinal axis from a base of said recess.

23. The cutting tool assembly of claim 18, 19, 21 or 22 wherein the shank and the cartridge include an alignment mechanism configured to locate the cartridge on the shank such that the through hole and the threaded hole are aligned for reception of the screw fastener.

* * * * *